June 21, 1938. J. F. TRITLE Re. 20,770

ELECTRIC SWITCH

Original Filed Oct. 28, 1921

Inventor:
John F. Tritle,
by Albert G. Davis
His Attorney

Reissued June 21, 1938

Re. 20,770

UNITED STATES PATENT OFFICE 20,770

ELECTRIC SWITCH

John F. Tritle, Erie, Pa., assignor to General Electric Company, a corporation of New York Original No. 1,560,440, dated November 3, 1925, Serial No. 511,000, October 28, 1921. Application for reissue filed March 29, 1938, Serial No. 198,703

39 Claims. (Cl. 200—89)

Figure 1:
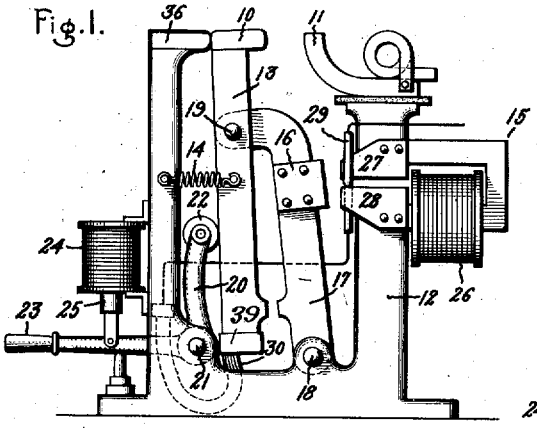

In certain of its aspects, my invention is directed to improvements in electric switches of the "trip free" type; that is, a type of switch which is arranged to automatically open upon the occurrence of an overload and which can not be held closed by the operating means during an overload in the controlled circuit. Such switches have usually involved the use of triggers, latches and the like which normally establish an operative connection between the switch closing means and the switch contacts, and the arrangement is usually such that the operative connection is broken upon the occurrence of an overload, whether the overload is present when the switch is first closed or occurs some time after the switch is closed. A switch of this type is described and broadly claimed in Patent No. 942,491, issued December 7, 1909, to Edward M. Hewlett and William Le Roy Emmet. Switches constructed and arranged in the manner described in said patent are entirely successful for ordinary applications, but they leave something to be desired for applications where a very high speed of operation is desired, because of the time interval of operation of the triggers, latches and the like.

In my former Patent No. 1,323,798, issued December 2, 1919, reissued on August 29, 1922, No. 15,441, I have described and claimed broadly a high speed automatic circuit breaker in which triggers, latches and the like are dispensed with, and the present invention is directed to improvements in this type of switch whereby an improved "trip free" arrangement is provided. However, I would have it understood that the present invention is not necessarily limited to its use in a switch as described and claimed in my said patent, but has a broader application as will be apparent to those skilled in the art from an understanding of the same.

In accordance with the invention, the operating means for the switch does not directly close the switch, but merely initiates the closing movement and places the switch in a position to automatically close in accordance with a strain set up during the initial movement toward the closed position. After the initial movement toward the closed position is completed, the switch contacts are mechanically held out of engagement until the operating means is released, whereupon the switch automatically closes to be held closed in any suitable manner, preferably that described in my said former patent. The arrangement is such that in case the switch should be closed on an overload or even a short circuit, the switch is free to open very quickly, since the connection with the operating means is already broken before the switch is permitted to close.

In the preferred form of my invention, I provide electromagnetic means for holding the switch closed and for effecting the quick opening of the same in response to an overload by shunting the holding flux of the electromagnet from its cooperating magnetic movable member, as described in my said former patent. The arrangement is preferably such that in case the holding electromagnet is deenergized, the operating means is ineffective to close the switch.

Another feature of my invention relates to an improved form of quick acting circuit interrupting contacts in which one of the contacts is mounted on a switch member for movement about a pivot, the moment of inertia of the switch member being greatest on the end of the switch member opposite to the end carrying the contact so that the end carrying the contact will move quickly to open the circuit.

My invention also provides an improved arrangement whereby the shocks and strains set up in the switch in opening are reduced to a minimum.

Figure 4:
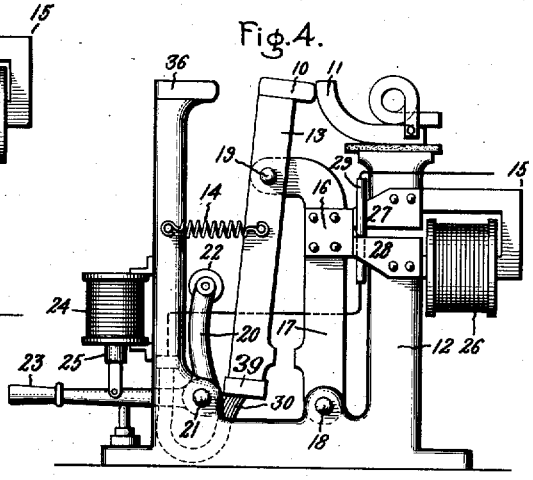
Figure 2:
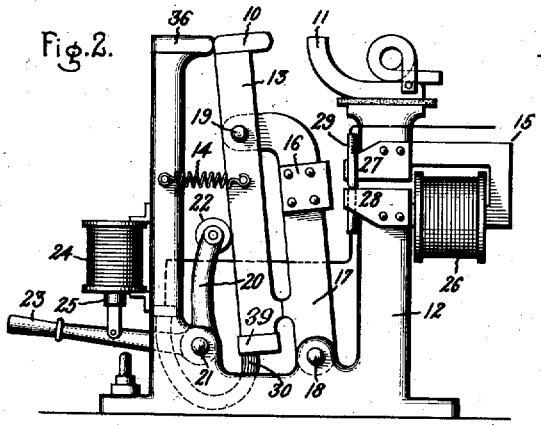
Figure 5:
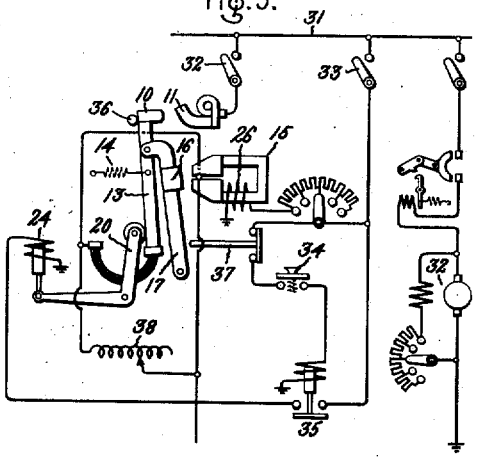
Figure 3:
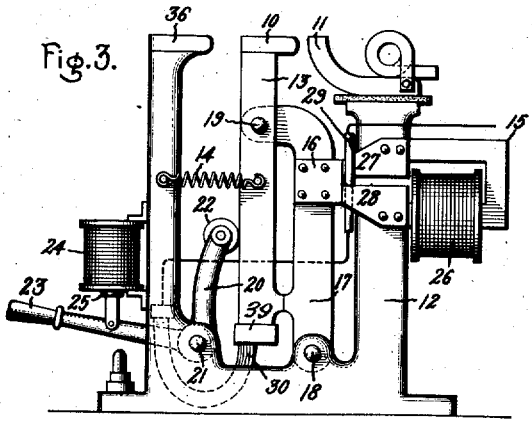

For a better understanding of the invention, reference is had to the accompanying drawing in which I have shown an embodiment of the invention for purposes of illustration, and in which Fig. 1 is a side view of the switch in the open position; Fig. 2 shows the relative positions of the parts during the first part of the closing movement; Fig. 3 shows the relative positions of the parts of the switch when the initial closing movement is completed; Fig. 4 shows the relative positions of the parts when the operating member is released and the switch closes due to the strain set up during the initial closing movement; and Fig. 5 is a simplified diagram of connections in which the switch of the invention is shown diagrammatically.

Referring to the drawing, the switch comprises a pair of relatively movable switch contacts 10 and 11 for closing the circuit controlled by the switch. The contact 10 is arranged so as to be movable into engagement with the contact 11 which may be a stationary contact rigidly mounted on but insulated from the support 12. The contact 10 is carried by the pivotally mounted switch member or operating arm 13 which is biased to the open position shown in Fig. 1 by the effect of gravity and also by means of the spring 14. The switch member 13 is arranged to be held in the closed position by means of the electromagnet 15 which has a magnetic movable member or armature 16. The armature 16 is carried by the member 17 which is pivotally connected to the support 12 at 18 and pivotally connected to the switch member 13 at 19.

The closing means for the switch comprises an operating member 20 which is pivotally mounted in the support 12 at 21. This operating member carries a roller 22 at its upper end adapted to cooperate with the lower end of the switch member 13, that is, the end of the switch member opposite to the end which carries the contact 10. The operating member 20 may be manually operated by means of a handle 23, or it may be electromagnetically operated by means of the electromagnet 24 having a plunger 25 connected to the operating member 20.

The drawing shows the preferred form of my invention in which the means for holding the switch in the closed position comprises the electromagnet 15 having a shunt coil 26. The armature 16 of the electromagnet is adapted to bridge the poles 27 and 28 of the electromagnet, and the conductor 29 included in the circuit controlled by the switch or energized responsively to the current through the switch, is disposed in the air gap between the two poles 27 and 28 adjacent to the contacting surfaces of the armature 16 and the poles 27 and 28. As described in my former Patent No. 1,323,798, the electromagnet will normally hold the armature 16 in the attracted position as long as the conditions in the electric circuit controlled by the switch are normal, but in case an abnormal circuit condition should arise, such for instance, as an overload, the magnetic field set up by the conductor 29 will cause the flux set up by the electromagnet 15 to be shunted away from the armature 16, thereby releasing the armature and permitting the switch to open. It will be understood that the electromagnet 15 is incapable of magnetically operating the armature 16 to close the switch against the action of the spring 14.

The flexible conductor 30 is connected to the lower end of the switch member 13 and carries the current in the circuit controlled by the switch. It will be observed that the conductor 30 forms a partial loop, so that when the switch is closed in case there should be an abnormal rush of current through the switch, this conductor will tend to straighten and thereby move the lower end of the switch member 13 counterclockwise, thus assisting the opening movement of the switch.

It is believed that the features of construction and arrangement and the operation of the switch will be understood from the above general description and a consideration of Fig. 5 taken in connection with Figs. 2, 3 and 4. Referring to Fig. 5, the electric switch of my invention is adapted to control an electric circuit supplied with energy through the conductor 31 by means of the generator 32. In order to close the switch and connect the circuit controlled thereby to the supply conductor 31, the disconnecting switch 32 and the pilot switch 33 are first closed. The normally open push button 34 is then closed, thereby energizing the relay 35 to close and thus energize the winding of the closing electromagnet 24. The operating member 20 is thereby caused to move the lower end of the switch member 13 counterclockwise about the pivotal support 19, the switch contact 10 in the meantime remaining in engagement with the stop 36 on the support 12. The spring 14 is put under a slight strain. The various parts of the switch will now be in the positions shown in Fig. 2. A continuation of the movement of the operating member will move both the switch member 13 and the armature 16 about the pivotal support 18 until the armature 16 is brought into engagement with the poles 27 and 28 of the holding electromagnet. Inasmuch as the holding electromagnet is energized by reason of the fact that the pilot switch 33 is closed, the magnetic movable member of the switch will be held in the attracted position. The various parts of the switch are now in their respective positions shown in Fig. 3. It will be observed that the spring 14 has been put under additional strain, and because of the fact that the spring is connected to the switch member 13 on one side of the pivotal connection 19 and the contact 10 on the opposite side thereof, the spring now serves to bias the contact 10 into engagement with the stationary contact 11. However, the contacts will be mechanically held out of engagement as long as the operating member 20 applies pressure to the lower end of the switch member 13. As soon as the operating member 20 is released to return to its original position, the spring 14 is released to move the switch member 13 clockwise about its pivotal support 19 into engagement with the stationary contact 11, the switch thus closing entirely free of the operating member. The spring 14 is connected to the switch member 13 at a position such that the desired pressure is applied to the contacts 10 and 11 and in addition gives an accelerating force for quickly moving the members 13 and 17 when the switch is to be opened. The contacting surfaces of the contacts 10 and 11 are so disposed with respect to the pivot point 19 that there is a sliding action of the contact 10 with respect to the contact 11 when the switch closes. When the switch is thus closed and mechanically held closed, the various parts of the switch will be in their respective positions shown in Fig. 4.

By reference to Fig. 5, it will be noticed that the auxiliary switch 37 is opened when the armature 16 of the switch is moved to the attracted position, thereby deenergizing the relay 35 and permitting this relay to open and deenergize the electromagnet 24 for the operating mechanism so that when the armature is moved to the attracted position the operating member 24 is automatically released. When the switch is closed, the conductor 29 disposed in the air gap between the poles 27 and 28 of the holding electromagnet 15 will cause the holding flux of the electromagnet to be shunted away from the armature 16 in case the current through the switch is greater than the predetermined value. The armature 16 is thereby released and the switch permitted to return to its normal open position, that shown in Fig. 1. It will also be observed that the flexible conductor 30 will tend to straighten due to the current through the switch, thereby assisting the opening effect. It will be seen that the straightening action of the conductor 30 is coincident with the effect of the conductor 29 in shunting the magnetic flux of the electromagnet 15 away from the armature 16 so that the opening effects of the conductor 29 and the conductor 30 are simultaneous.

The weight 39 on the lower end of the switch member is provided for insuring that the moment of inertia of the part of the member 13 below the point of connection with the spring 14 is greater than the moment of inertia of the member 13 above the point of connection with the spring so that when the armature 16 is released to move about the pivot 18, the upper part of the switch member will move at a much greater rate of speed than the lower part. This causes the contacts 10 and 11 to begin to open practically simultaneously with the beginning of movement of the armature 16 to the released position and also prevents the switch member from turning clockwise about the pivot 19.

The partial loop in the flexible conductor 30 adds to the effect of the weight 39 in holding back the lower end of the switch member. The weight 39 should be located as near as possible to the pivot point 18 so that a minimum force is required to rotate the member 17 and the switch member 13 about the pivot point 18. This feature is of particular advantage when the switch is closed on a short circuit, since the contacts are thereby permitted to interrupt the controlled circuit very quickly.

The inductive shunt 38 around the conductor 29 is provided for causing the switch to open at one value of current when the rate of change of the current is abnormal and at a materially smaller value of current when the rate of change of the current is very high, as, for instance, a short circuit. This feature of the switch is fully described in my aforesaid prior patent.

The switch will ordinarily be provided with a magnetic blow out, as shown, and a suitable arc chute, although these features are not of the essence of the invention. It will be seen that the operating member 20 for the switch does not directly close the switch, but merely initiates the closing movement and puts the switch member 13 under a strain to the closed position, which does not become effective until the operating member 20 is released. The switch is thus free to open very quickly, since the connection of the operating member 20 is already broken before the switch is permitted to close. It will also be observed that the result is effected without the use of triggers, latches and the like, and that the arrangement is therefore capable of opening at a comparatively high speed.

The stored up energy in the member 17 and the switch member 13 when the switch opens is considerable. In order to minimize the strains set up in the parts of the switch, the arrangement is such that the roller 22 is disposed with respect to the switch member 13 so that this roller is engaged before the contact 10 makes engagement with the stop 36. When the roller 22 is engaged a considerable part of the stored up energy is used to reverse the movement of the lower end of the switch member 13 about the pivot point 19. Since this lower end is free to move, a considerable part of the stored energy may thereby be dissipated in accelerating the weight 39 and the shock and strains in the moving members of the switch when the switch opens are greatly reduced.

In case the holding electromagnet is not energized, the operating member 20 is ineffective to close the switch, since it is necessary for the lever 17 to be magnetically held so that the switch member may turn about the pivot 19 to the closed position.

It is obvious that the switch contacts may be opened at will by simply moving the operating member 20 in the closing direction. Thus, with the switch closed as shown in Fig. 4, by moving the operating member 20 in the closing direction, the contact 10 will assume the position shown in Fig. 3 and thus open the controlled circuit.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An electric switch comprising a stationary contact, a cooperating movable contact, operating means for moving said movable contact between closed and open circuit positions, means biasing said operating means to said open circuit position, current responsive holding means for releasably holding a point of said operating means in a predetermined position against the force of said biasing means to cause said biasing means to bias said operating means to said closed circuit position, and an operating member cooperating with said operating means so as to be movable in one direction to move said operating means to a position to be held by said holding means and thereby put said biasing means under a strain to move said operating means to said closed circuit position while holding said operating means against said strain, then movable in the return direction to release said operating means for closure by said biasing means, and thereafter movable in said one direction to move said operating means to said open position against the force of said biasing means while said operating means is held by said holding means.

2. An electric switch comprising a stationary contact, a movable contact, a switch member for operating said movable contact, holding means responsive to the current in the circuit of said contacts for releasably holding said switch member for pivotal movement about a predetermined point, a spring connected to said switch member for biasing said switch member for pivotal movement about said point to bring said movable contact into engagement with said stationary contact and for biasing said switch member for movement to an open circuit position when said switch member is released by said holding means, and an operating member for moving said switch member about said point between open and closed circuit positions and for moving said switch member to a position to be held by said holding means after said switch member has been released by said holding means, said operating member cooperating with said switch member so as to be movable in one direction after release of said switch member by said holding means to move said switch member to a position to be held by said holding means and thereby place said spring under a strain to move said switch member about said point to a closed circuit position, which strain becomes effective when said operated member is returned, said spring moving said switch member to said open circuit position regardless of the position of said operating member when said switch member is released by said current responsive holding means.

3. An electric switch comprising a stationary contact, a switch member provided with a movable contact arranged to cooperate with said stationary contact, holding means responsive to the current in the circuit of said contacts for releasably holding a point of said switch member in a predetermined position, a spring connected to said switch member for biasing said switch member for pivotal movement about said point to bring said movable contact into engagement with said stationary contact and for biasing said switch member for movement to an open circuit position when said switch member is released by said holding means, and manually operable means for moving said switch member about said point between open and closed circuit positions and for moving said switch member to a position to be held by said holding means after said switch member has been released by said holding means, said manually operable means cooperating with said switch member so as to be movable in one direction after release of said switch member by said holding means to move said switch member to a position to be held by said holding means and thereby place said spring under a strain to move said switch member about said point to a closed circuit position, which strain becomes effective when said manually operable means is returned, and thereafter movable in said one direction with said switch member held by said holding means to move said switch member about said point to an open circuit position against the force of said spring.

4. An electric switch comprising a pair of relatively movable switch contacts biased to the open position, an electromagnet for holding the contacts in the closed position, and means for closing the contacts arranged to first put the contacts under strain to the closed position while holding the contacts out of engagement and to then release the contacts to close in accordance with the said strain so as to be held in the closed position by the said electromagnet.

5. An electric switch comprising a pair of relatively movable switch contacts biased to the open position, an electromagnet for holding the contacts in the closed position, an operating member for closing the contacts, a spring connected to one of the contacts and controlled by the said operating member, and connections whereby the operating member puts the said spring under strain to close the contacts and holds the contacts out of engagement and then permits the spring to close the contacts and gives the control of the contacts to the said electromagnet.

6. An electric switch comprising an electromagnet having a magnetic movable member biased to the unattracted position and arranged when in the attracted position to hold the switch in the closed position, and operating means for the switch for moving the said magnetic member to the attracted position and placing the switch under a strain to the closed position which becomes effective to close the switch when the operating means is released.

7. An electric switch comprising a pair of relatively movable switch contacts biased to the open position, operating means for closing the said contacts, an electromagnet for holding the said contacts in the closed position, the said electromagnet having a magnetic movable member connected to one of said contacts and biased to the unattracted position, and means whereby the said magnetic member is operated to the attracted position by the said operating means and the switch contacts are given a bias to the closed position which becomes effective to close the switch when the operating means is released.

8. An electric switch comprising a pair of relatively movable switch contacts biased to the open position, means for holding the contacts in the closed position, an operating member for the contacts, and connections through which the said operating member governs the contacts whereby moving the operating member in one direction effects partial movement of one of said contacts toward the closed position and the return of the operating member effects the completion of the closing movement of the said contact through the cooperation of said holding means.

9. An electric switch comprising a pair of relatively movable switch contacts biased to the open position, operating means for closing the said contacts, an electromagnet for holding the said contacts in the closed position, the said electromagnet having a magnetic movable member connected to one of the said contacts and biased to an unattracted position, and means whereby the said magnetic member is operated to the attracted position by the said operating means and the said contacts are closed by the return of the operating means to its initial position.

10. An electric switch comprising a pair of relatively movable switch contacts, means biasing said contacts to the open position, means for holding the contacts in the closed position against the force applied by said biasing means, an operating member, and connections through which the operating member governs the contacts whereby moving the member in the closing direction places said biasing means under a strain to move the contacts to the closed position which strain becomes effective when the member is returned and a subsequent movement of the member in the closing direction with the contacts held closed by said holding means effects an opening of the contacts against the force of said biasing means.

11. An electric switch comprising a pair of relatively movable switch contacts biased to the open position, an electromagnet having a magnetic movable member biased to the unattracted position and connected to one of the said contacts for holding the same in the closed position, a spring connected to one of the said contacts, an operating member for closing the contacts, and means whereby the operating member moves the said magnetic member to the attracted position and puts the said spring under a strain to close the contacts which does not become effective to close the contacts until the operating means is released.

12. An electric switch comprising a pair of relatively movable switch contacts biased to the open position, an electromagnet having a magnetic movable member biased to the unattracted position and connected to one of the said contacts for holding the same in the closed position, a spring connected to one of the said contacts, an operating member for closing the contacts, and means whereby the operating member first moves the said magnetic member to the attracted position, puts the said spring under a strain to close the contacts and mechanically holds the contacts out of engagement, and then releases the said spring to close the contacts free of the operating member.

13. An electric switch comprising a pair of relatively movable switch contacts biased to the open position, an electromagnet having a magnetic movable member connected to one of the said contacts for operating the same, an operating member cooperating with said magnetic member for closing the contacts, one of the said contacts mounted for movement with respect to the said magnetic member against a bias opposing the said movement and positioned to be engaged by the said operating member to effect the closing of the switch in accordance with the said bias when the said magnetic member is moved by said operating member to a position to be magnetically held by the said electromagnet and the operating member is then moved free of the said contacts.

14. An electric switch comprising a pair of normally open switch contacts, a pivotally mounted switch member carrying one of the said contacts, an electromagnet having a magnetic movable member providing the pivotal support for the said switch member and arranged to magnetically hold the switch member in the closed position, an operating member for moving the magnetic member to the attracted position and for moving the switch member a limited distance toward the closed position, and a spring connected to be put under strain by the said movement for moving the switch member about its pivotal support to the closed position when the operating member is released.

15. An electric switch comprising a pair of normally open switch contacts, a pivotally mounted switch member carrying one of the said contacts, an electromagnet having a magnetic movable member providing the pivotal support for the said switch member and arranged to magnetically hold the switch member in the closed position, an operating member cooperating with one end of the said switch member for first moving the switch member in one direction about its pivotal support into operative engagement with the magnetic member and then moving the magnetic member to the attracted position and the switch member a limited distance toward the closed position, and a spring connected to be put under strain by the said movement for moving the switch member in the other direction about its pivotal support to the closed position when the operating member is released.

16. An electric switch comprising a pair of normally open switch contacts, a switch member carrying one of the said contacts on one end thereof, an electromagnet having an armature pivotally mounted at one end and pivotally connected to the switch member at its other end, an operating member cooperating with the end of the switch member opposite the end carrying the said contact to move the switch member in one direction into operative engagement with the said armature and then move the armature to the attracted position and the switch member a limited distance toward the closed position, and a spring connected to said switch member put under strain by the movement of the switch member for moving the switch member in the other direction about its pivotal support to close the switch when the operating member is released.

17. An electric switch comprising a switch member biased to the open position, operating means for moving the switch member toward the closed position against a spring tension, an electromagnet for holding the switch member in the closed position, and means whereby upon the release of the said operating means the said spring tension is effective to close the switch only when the said electromagnet is energized.

18. An electric switch comprising an electromagnet having a magnetically movable member biased to the unattracted position, a switch member biased to the open position and held in the closed position by the said magnetic member when in the attracted position, operating means for the switch for moving the said magnetic member to the attracted position and placing the said switch member under a spring tension, and means whereby the switch member is operated to the closed position in accordance with the said spring tension upon the release of the said operating means if the said electromagnet is energized or the switch member is returned to its biased position in accordance with said spring tension upon the release of the said operating means if the said electromagnet is deenergized.

19. An interrupter for electric circuits comprising a pair of relatively movable engaging circuit interrupting contacts, a switch member connected to move about a pivot and carrying one of the said contacts on one end thereof, the inertia of the end of the switch member carrying the said contact being less than the inertia of the other end of the switch member, and a second member connected with the said switch member to hold the same in the closed position and to move the said contact about a second pivot to quickly interrupt the circuit controlled by the said contacts.

20. An electric switch comprising a pair of switch contacts, a switch member biased to the open position carrying one of said contacts on one end thereof, a second member pivotally connected to the switch member for holding the same in the closed position and connected to move about a pivot, a spring connected to the switch member and put under strain during the closing operation of the switch for moving the switch member about the pivotal connection with the said second member to bring the said contacts into yielding engagement and for biasing the said members to their respective open positions, the moment of inertia of the end of the switch member carrying the said contact about the point of connection with the said spring being less than the moment of inertia of the other end of the switch member about the point of connection with the said spring, whereby the said contact is moved by the said second member about the said pivot to quickly interrupt the circuit controlled by the switch.

21. An electric switch comprising a pair of switch contacts, a switch member biased to open position carrying one of the switch contacts on one end thereof, a second member connected to move about a pivot and connected to the switch member for holding the same in the closed position, the connection between said members permitting relative movement, means for applying a force at a point on said switch member to bias the said members to their respective open positions and to cause the said contacts to make a yielding engagement with each other, the moment of inertia of the end of the switch member carrying the said contact about the said point being less than the moment of inertia of the other end of the switch member about the said point, whereby the said second member moves the said contact about the said pivot to quickly interrupt the circuit controlled by the switch.

22. An electric switch comprising a pair of switch contacts, a switch member biased to the open position carrying one of said contacts on one end thereof, and a weight on the other end, a second member pivotally connected to the switch member and connected to move about a second pivot, the said second member arranged to hold the switch member in the closed position against a bias to the open position, a spring connected to the switch member at a point between the connection with the said second member and the said weight for biasing the said members to their respective open positions and for causing the said contacts to make a yielding engagement with each other, whereby the movement of the said second member to its biased position upon the release of the same causes the said contact to move about the said second pivot to quickly interrupt the circuit controlled by the switch.

23. An electric switch comprising a pair of switch contacts, a switch member biased to the open position carrying one of said contacts on one end thereof, a second member connected to move about a pivot and connected to the switch member for holding the same in the closed position, the connection between the said members permitting relative movement, means for applying a force at a point on said switch member to bias the said members to their respective open positions and to cause the said contacts to make a yielding engagement with each other, a weight on the end of the switch member located adjacent to the said pivot to give the end of the switch member a greater moment of inertia about the said point than the end of the switch member carrying the said contact, whereby in opening the switch the said second member moves the said contact about the said pivot to quickly interrupt the circuit controlled by the switch.

24. An interrupter for electric circuits comprising a pair of relatively movable engaging circuit interrupting contacts, a switch member connected to move about a pivot and carrying one of the said contacts on one end thereof, the inertia of the end of the switch member carrying the said contact being less than the inertia of the other end of the switch member, a second member connected with the switch member to hold the same in the closed position and to move the said contact about a second pivot to quickly interrupt the circuit controlled by the said contacts, and a resilient electrical connection to the said end of the switch member having the greatest inertia.

25. An interrupter for electric circuits comprising a pair of relatively movable engaging circuit interrupting contacts, a switch member connected to move about a pivot and carrying one of the said contacts on one end thereof, the inertia of the end of the switch member carrying the said contact being less than the inertia of the other end of the switch member, a second member connected with the switch member to hold the same in the closed position and to move the said contact about a second pivot to quickly interrupt the circuit controlled by the said contacts, and a bent resilient conductor connected to the end of the switch member having the greatest inertia for causing an opening movement of the switch member about the first pivot responsively to the current through the switch member.

26. An electric switch comprising a pair of switch contacts, a switch member biased to the open position carrying one of said contacts on one end thereof, a second member pivotally connected to the switch member for holding the same in the closed position and connected to move about a pivot, a spring connected to the switch member and put under strain during the closing operation of the switch for moving the switch member about the pivotal connection with the said second member to bring the said contacts into yielding engagement and for biasing the said members to their respective open positions, the moment of inertia of the end of the switch member carrying the said contact about the point of connection with the said spring being less than the moment of inertia of the other end of the switch member about the point of connection with the said spring, and a bent resilient conductor connected to the end of the switch member having the greatest moment of inertia for causing an opening movement of the switch member about the pivotal connection with the said second member, whereby when the switch opens the said contact is moved about the said pivot and about the said pivotal connection with the second member simultaneously to quickly interrupt the circuit controlled by the switch.

27. An interrupter for electric circuits comprising a pair of relatively movable circuit interrupting contacts, a switch member biased to the open position carrying one of the said contacts on one end thereof, and connected to move in one direction about a pivot between the ends of the switch member to close the said contacts, the inertia of the end of the switch member carrying the said contact being less than the inertia of the other end of the switch member, means for holding the switch member in the closed position, and means engaged by the said other end of the switch member when the said holding means is released for relieving the shock to the parts of the switch in opening.

28. An interrupter for electric circuits comprising a pair of relatively movable circuit interrupting contacts, a switch member biased to the open position carrying one of the said contacts on one end thereof, and connected to move in one direction about a pivot between the ends of the switch member to close the said contacts, the inertia of the end of the switch member carrying the said contact being less than the inertia of the other end of the switch member, means for holding the switch member in the closed position, a stop for limiting the opening movement of the end of the switch member carrying the said contact, and means engaged during the opening of the switch by the said other end of the switch member before the end carrying the contact engages the said stop when the said holding means is released for relieving the shock to the parts of the switch in opening.

29. An interrupter for electric circuits comprising a pair of relatively movable engaging circuit interrupting contacts, a switch member connected to move about a pivot and carrying one of the said contacts on one end thereof, the inertia of the end of the switch member carrying the said contact being less than the inertia of the other end of the switch member, a second member connected to the switch member to hold the same in the closed position and to cause a movement of the said contact about a second pivot to quickly interrupt the circuit controlled by the said contacts, and means engaged by the said end of the switch member having the greatest moment of inertia during the opening movement of the said members to cause a movement of the said end of the switch member to take up the shock to the parts of the switch in opening.

30. An interrupter for electric circuits comprising a pair of relatively movable engaging circuit interrupting contacts, a switch member biased to the open position carrying one of the said contacts on one end thereof, the said switch member connected to move in one direction about a pivot to close the switch and to move in the other direction about the pivot when the switch opens, the inertia of the end of the switch member carrying the said contact being less than the inertia of the other end of the switch member, a second member connected to the switch member to hold the same in the closed position and to cause a movement of the said contact about a second pivot to quickly interrupt the circuit controlled by the said contacts, a stop engaged in the open position of the switch for the end of the switch member carrying the said contact, and means engaged by the said other end of the switch member before the said stop is engaged during the opening movement of the switch to reverse the movement of the said other end of the switch member about the first pivot to take up the shock of opening.

31. An interrupter for electric circuits comprising a pair of relatively movable engaging circuit interrupting contacts, a switch member connected to move about a pivot and carrying one of said contacts on one end thereof, the inertia of the end of the member carrying the said contact being less than the inertia of the other end of the switch member. means connected to the switch member for holding the same in the closed position and for moving the said switch member to interrupt the circuit controlled by the contacts, an operating member cooperating with the said other end of the switch member to initiate the closing movement of the switch and to engage the said other end to cause a movement of the switch member about the said pivot when the switch opens to thereby take up the shock of opening.

32. An interrupter for electric circuits comprising a pair of relatively movable engaging circuit interrupting contacts, a switch member biased to the open position carrying one of the said contacts on one end thereof, the said switch member connected to move in one direction about a pivot to close the said contacts and in the other direction about the pivot when the switch opens, the inertia of the end of the switch member carrying the said contact being less than the inertia of the other end of the switch member, a second member connected to the switch member to hold the same in the closed position and to cause a movement of the said contact about a second pivot to quickly interrupt the circuit controlled by the said contacts, a stop engaged in the open position of the switch for the end of the switch member carrying the said contact, an operating member cooperating with the said other end of the switch member to initiate the closing movement of the switch and to reverse the movement of the said other end of the switch member before the said stop is engaged during the opening movement of the members to take up the shock of opening.

33. An electric switch comprising a pair of switch contacts, a switch member biased to an open position carrying one of said contacts on one end thereof, a second member pivotally connected to the switch member for holding the same in the closed position and connected to move about a pivot, a spring connected to the switch member and put under strain during the closing operation of the switch for moving the switch member in one direction about the pivotal connection with the said second member to bring the said contacts into yielding engagement and for biasing the said members to their respective open positions, the moment of inertia of the end of the switch member carrying the said contact about the point of connection with the said spring being less than the moment of inertia of the other end of the switch member about the point of connection with the said spring, a stop engaged in the open position of the switch by the end of the switch member carrying the said contact, an operating member cooperating with the said other end of the switch member to initiate the closing movement of the switch and to reverse the movement of the said other end of the switch member about the pivotal connection with the said second member before the said stop is engaged during the opening movement of the members to take up the shock of opening.

34. An electric switch comprising a stationary contact, a cooperating movable contact, an operating arm for moving said movable contact between closed and open circuit positions, current responsive means normally releasably retaining one point of said operating arm in a predetermined position serving as a pivot point about which said operating arm is normally rotatable between closed and open circuit positions, a spring applying a biasing force to move said operating arm about said pivot point to one of said positions when said arm is in said closed circuit position and at the same time biasing said operating arm to move upon release of said pivot point by said current responsive means and move said movable contact toward open circuit position, and a pivoted operating member operatively connected with said operating arm to move said operating arm about said pivot point between closed and open circuit positions.

35. An electric switch comprising a pair of contacts one of which is movable, an operating arm for said movable contact mounted for movement between closed and open circuit positions, current responsive means engaging and normally holding a point of said operating arm, a handle member cooperating with said operating arm and movable relative to said operating arm to move said operating arm about said point between closed and open circuit positions, and a spring applying a biasing force to move said operating arm about said pivot point to one of said positions when said operating arm is in said closed circuit position and at the same time biasing said operating arm for movement when released by said current responsive means to move said movable contact toward open circuit position.

36. In a circuit interrupter, a pair of contacts one of which is movable, an operating arm for moving said movable contact between open and closed positions, said operating arm having current responsive means normally releasably retaining one point thereof at a fixed point serving as a pivot point about which said operating arm for the movable contact is normally rotatable, a spring applying a biasing force to said operating arm for the movable contact when in the closed position, said spring then biasing said movable contact into engagement with the other contact and at the same time biasing said pivot point on the operating arm for the movable contact to move upon release of said current responsive means and move the movable contact toward open position.

37. In a circuit interrupter, a pair of contacts one of which is movable, an operating arm for moving said movable contact between open and closed positions, said operating arm having means normally releasably retaining one point thereof at a fixed point serving as a pivot point about which said operating arm for the movable contact is normally rotatable, means movable to cause the normal movement of said movable contact between open and closed position including a handle member and a cooperating spring applying a biasing force to said operating arm for the movable contact when in the closed position, said spring then biasing said movable contact into engagement with the other contact and at the same time biasing said point on the operating arm for the movable contact to move upon release of said retaining means and move the movable contact toward open position.

38. In a circuit interrupter, a pair of contacts one of which is movable, an operating arm for moving said movable contact between open and closed positions, said operating arm having means normally releasably retaining one point thereof at a fixed point serving as a pivot point about which said operating arm for the movable contact is normally rotatable, means movable to cause the normal movement of said movable contact between open and closed position including a handle member and a cooperating spring applying a biasing force to said operating arm for the movable contact when in the closed position, said spring then biasing said movable contact into engagement with the other contact and at the same time biasing said point on the operating arm for the movable contact to move upon release of said retaining means and move the movable contact toward open position, and said movable contact being movable to open position upon release of said retaining means irrespective of the position in which said handle member may be held.

39. In a circuit interrupter, a pair of contacts one of which is movable, an operating arm for moving said movable contact between open and closed positions, said operating arm having means normally releasably retaining one point thereof at a fixed point serving as a pivot point about which said operating arm for the movable contact is normally rotatable, means movable to cause the normal movement of said movable contact between open and closed position including a handle member and a cooperating spring applying a biasing force to said operating arm for the movable contact when in the closed position, said spring then biasing said movable contact into engagement with the other contact and at the same time biasing said point on the operating arm for the movable contact to move upon release of said retaining means and move the movable contact toward open position, and said handle member being movable to return said point on the operating arm to the position where it is releasably retained.

JOHN F. TRITLE.